United States Patent [19]
Seok et al.

[11] Patent Number: 5,996,760
[45] Date of Patent: Dec. 7, 1999

[54] CLUTCH FOR COMPRESSOR

[75] Inventors: Jong-myung Seok; Jong-hoon Choi, both of Taejon; Seung-woo Shin; Yun-won Lee, both of Ansan, all of Rep. of Korea

[73] Assignee: Halla Climate Control Corporation, Taejon, Rep. of Korea

[21] Appl. No.: 09/096,568

[22] Filed: Jun. 12, 1998

[30] Foreign Application Priority Data

Jun. 13, 1997 [KR] Rep. of Korea .................... 97-24709

[51] Int. Cl.⁶ ............................ F16D 19/00; F16D 27/00; F16D 37/02
[52] U.S. Cl. ................................ 192/84.961; 192/84.941
[58] Field of Search .................. 192/84.961, 84.941, 192/84 A

[56] References Cited

U.S. PATENT DOCUMENTS

| | | | |
|---|---|---|---|
| 4,308,728 | 1/1982 | Croset | 64/11 R |
| 5,642,798 | 7/1997 | Muirhead et al. | 192/84.961 |
| 5,683,299 | 11/1997 | Kishibuchi et al. | 192/84.961 |
| 5,687,823 | 11/1997 | Nakagawa | 192/84.961 |
| 5,692,591 | 12/1997 | Kimura | 192/84.961 |

Primary Examiner—Charles A Marmor
Assistant Examiner—Tisha D. Waddell
Attorney, Agent, or Firm—Leydig, Voit & Mayer, Ltd.

[57] ABSTRACT

A clutch for a compressor includes a pulley rotatably installed on a main body of the compressor to be coaxial with a rotary shaft of the compressor, a hub member fixed at the rotary shaft and having a flange through which a plurality of recesses are formed at its outer peripheral surface at intervals of a predetermined distance, elastic members, parts of which are received to the respective recesses to be supported, and other parts of which protrude from the recesses, an outer ring member for supporting the protruding parts of the elastic members, a stopper member for supporting the protruding parts of the elastic members together with the outer ring member to prevent the elastic members from moving, and a disk fixed on the outer ring member, for transmitting power by selectively being tightly coupled to or separated from a frictional surface of the pulley.

14 Claims, 10 Drawing Sheets

CLUTCH FOR COMPRESSOR

BACKGROUND OF THE INVENTION

1. Field of the Invention

The present invention relates to a clutch for a compressor, and more particularly, to a non-contact type clutch for a compressor, installed on a rotary shaft of a compressor in an air conditioning apparatus for an automobile, for temporarily suspending power transmitted from a driving source to the rotary shaft.

2. Description of the Related Art

A compressor used in an air conditioning apparatus for an automobile is driven by receiving power from an engine of the automobile. Thus, it is necessary to temporarily suspend the power transmitted from the engine to the rotary shaft of the compressor. An electromagnetic clutch installed on the rotary shaft of the compressor performs the interruption.

FIG. 1 shows an example of a conventional clutch.

As shown, the conventional clutch for a compressor includes a pulley 13 installed on a rotary shaft 12 of a main body 11a of a compressor 11 and having a housing portion 13a and a frictional surface 13b formed on rear and front surfaces thereof, and an electromagnet assembly 14 fixed on the main body 11a and having an electromagnet 14a received in the housing portion 13a.

A hub 15a is fixed on the rotary shaft 12. The hub 15a is coupled to a stopper plate 15. In the stopper plate 15, a disk 17 is spaced apart a predetermined distance from the frictional surface 13b by supporting means 20.

The supporting means 20 includes a rivet having a head 22a coupled to a plurality of throughholes 21 formed on the stopper plate 15, and the rivet 22 passes through the throughholes 21 to be riveted into the disk 17. A damper 23 made of rubber is adhered by an adhesive agent between the outer surface of the rivet 22 and the inner surface of the throughholes 21.

In the operation of the conventional clutch 10, the disk 17 is tightly coupled to the frictional surface 13b of the pulley 13 by a magnetic force generated when a predetermined current is applied to the electromagnet 14a. Thus, the rotational power of the pulley 13 rotated by the engine is transmitted to the rotary shaft 12.

When current does not flow in the electromagnet 14a, the disk 17 is separated from the frictional surface 13b of the pulley 13 due to elasticity of the damper 23 installed on the head 22a of the rivet 22 so that the rotational power of the pulley 13 is not transmitted to the rotary shaft 12 and the pulley 13 is raced.

In the operation of the clutch, when the rotary shaft 12 rotates at a high speed, the damper 23 positioned between the head 22a of the rivet 22 and the upper surface of the stopper plate 15 may be detached from the rivet 22. Also, since the damper 23 protrudes from the upper surface of the stopper plate 15, the overall compressor is relatively bulky.

Another conventional clutch (not shown), as disclosed in U.S. Pat. No. 5,687,823 (FIG. 1), includes a hub installed on a rotary shaft and having a predetermined width, a holder spaced apart a predetermined distance from the hub and coupled to a disk, and an elastic member interposed between the hub and the holder, for supporting the hub and holder. However, according to this technology, since the outer peripheral surface of the hub and the inner peripheral surface of the holder are adhered to the elastic member by an adhesive agent, the fabrication process is complex. Also, since the elastic member is integrally adhered between the outer peripheral surface of the hub and the inner peripheral surface of the holder in a ring shape, the frictional heat generated when the disk rotates at a high speed is directly transmitted to the elastic member. Thus, the adhesive strength becomes weak by the frictional heat so that the contact portion may become disjoined, which is an obstruction to the durability of the compressor.

In such conventional clutches, since the inner and outer rings have a predetermined width, the clutch is thick, thus the space required for installing the clutch in a compressor increases. Also, the weight of the clutch may increase due to a damper.

SUMMARY OF THE INVENTION

To solve the above problems, it is an objective of the present invention to provide a non-contact type clutch for a compressor which is lighter and which improves the operation efficiency by being coupled to an elastic member without using a separate adhesive agent and prevents the clutch from being separated from the elastic member due to a frictional heat.

It is another objective of the present invention to provide a clutch for a compressor which improves the reliability in detaching a disk from the frictional surface of a pulley.

Accordingly, to achieve the first objective, there is provided a clutch for a compressor including a pulley rotatably installed on a main body of the compressor to be coaxial with a rotary shaft of the compressor, a hub member fixed at the rotary shaft and having a flange through which a plurality of recesses are formed at its outer peripheral surface at intervals of a predetermined distance, elastic members, parts of which are received to the respective recesses to be supported, and other parts of which protrude from the recesses, an outer ring member for supporting the protruding parts of the elastic members, a stopper member for supporting the protruding parts of the elastic members together with the outer ring member to prevent the elastic members from moving, and a disk fixed on the outer ring member, for transmitting power by selectively being tightly coupled to or separated from a frictional surface of the pulley.

The outer ring member includes a skirt portion for accommodating the elastic members, and a supporting portion extending radially inward from the skirt portion, for supporting one side of the protruding parts of the elastic members.

Also, the stopper member is shaped of a ring supported on the inner peripheral surface of the outer ring member and has a supporting groove into which the protruding parts of the elastic members are received to be supported.

The stopper member is formed such that a plurality of unit members each having the supporting groove are juxtaposed to be connected.

The elastic members are formed of rubber and have a circular or cubic shape.

Also, the elastic members are mutually connected by a connection band.

According to another aspect of the present invention, there is provided a clutch for a compressor including a pulley rotatably installed on a main body of the compressor to be coaxial with a rotary shaft of the compressor, a hub member fixed on the rotary shaft and having a flange on which a single recessed groove is formed on its outer peripheral surface, ring-shaped elastic members whose inner peripheral portions are received in the recessed groove to be supported, and whose outer peripheral portions protrude from the recessed groove, an outer ring member for supporting the outer peripheral portions of the elastic members, a stopper member for supporting the outer peripheral portions of the elastic members together with the outer ring member to prevent the elastic members from moving, and a disk fixed on the outer ring member, for transmitting power by being selectively coupled tightly to or being separated from the frictional surface of the pulley.

In this case, the stopper member is shaped of a ring supported on the inner peripheral surface of the outer ring member and has a flange for supporting the other side of the outer peripheral portions of the elastic members.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
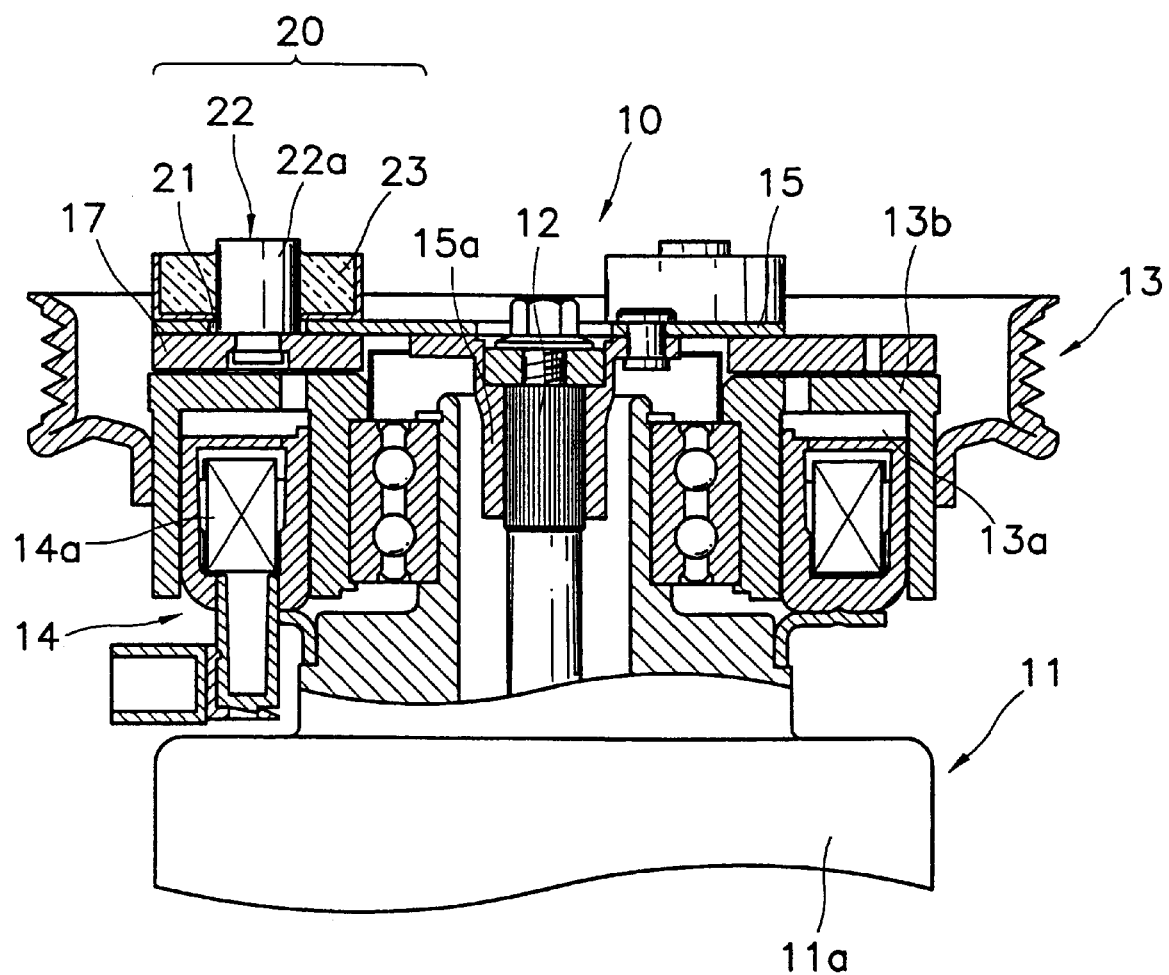
FIG. 1 is a cross-sectional view illustrating a conventional clutch for a compressor.
Figure 2:
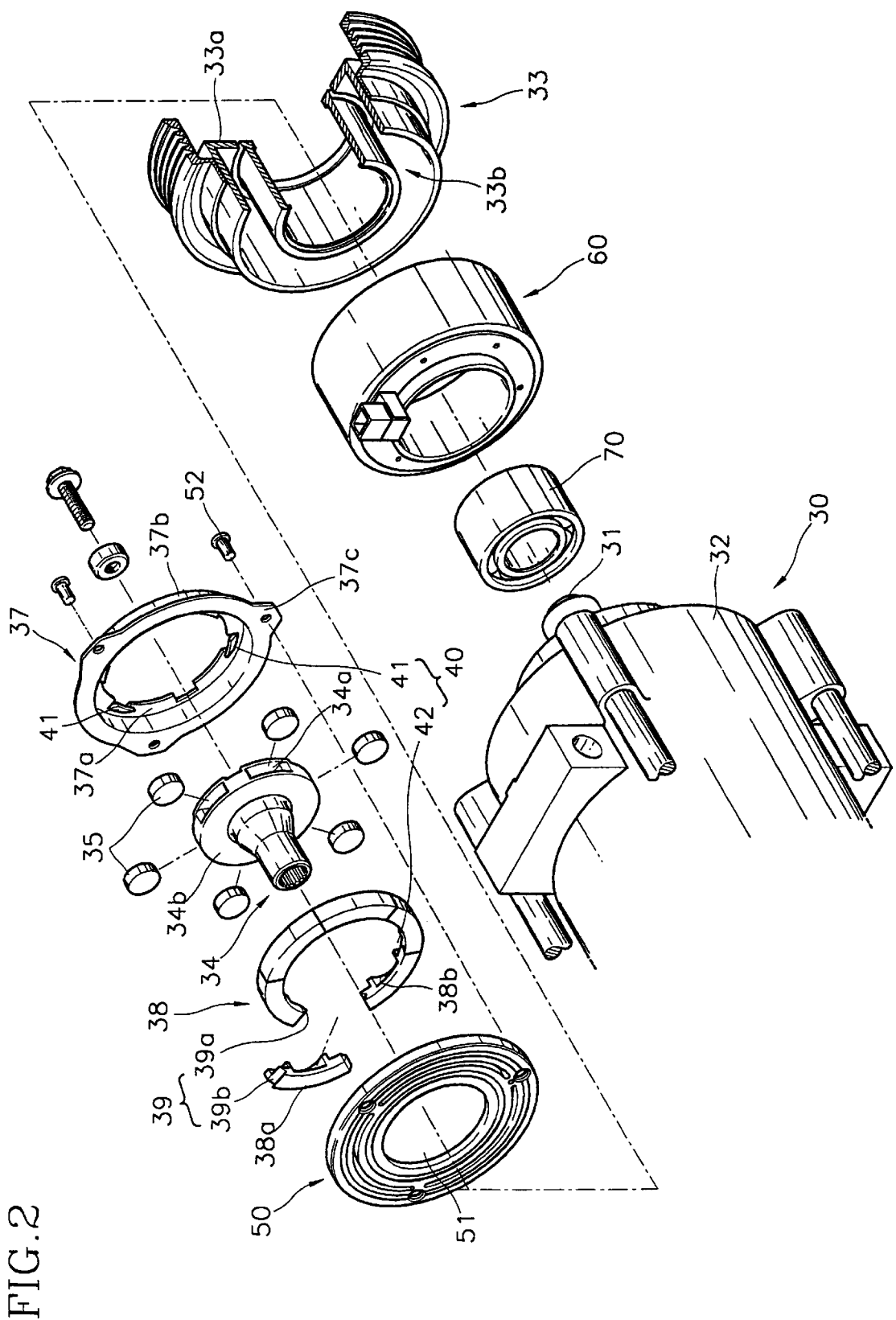
FIG. 2 is an exploded perspective view illustrating a clutch for a compressor according to a first embodiment of the present invention.
Figure 3:
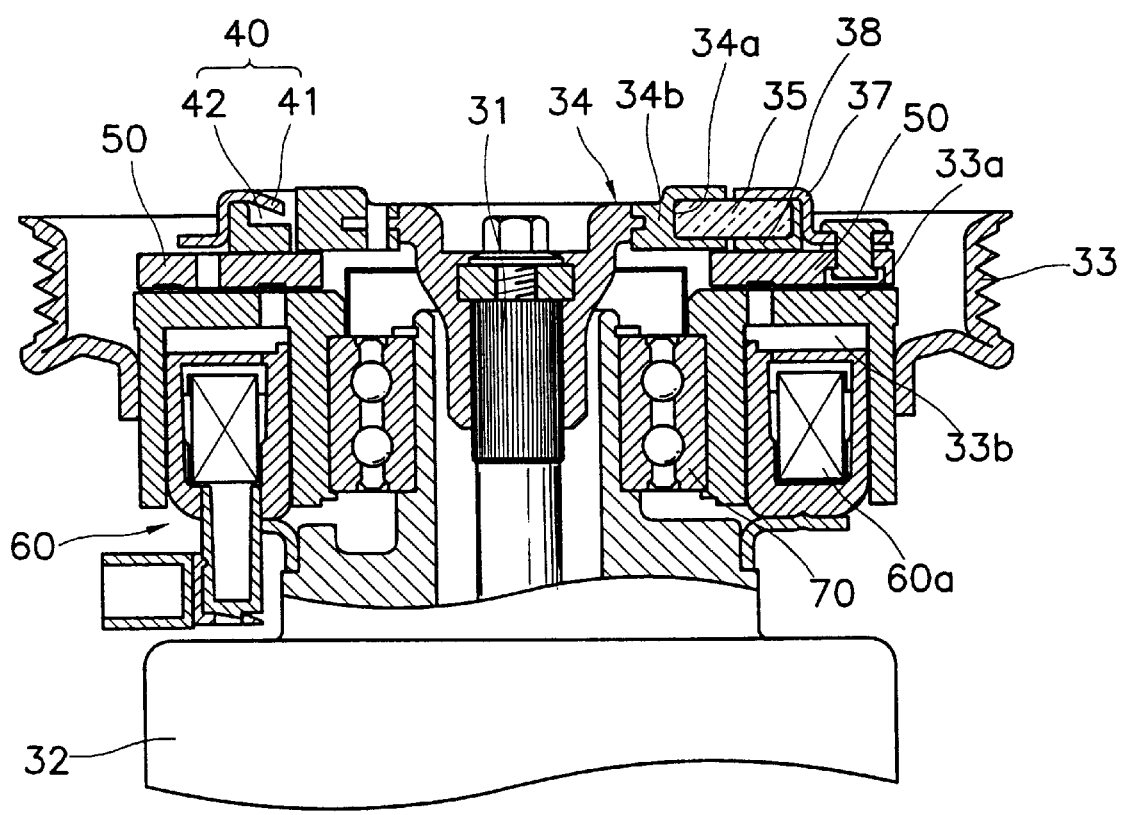
FIG. 3 is a cross-sectional view illustrating the assembled clutch for the compressor shown in FIG. 2.

FIGS. 2 and 3 show a compressor employing a clutch according to a first embodiment of the present invention.

As shown, a compressor 30 includes a main body 32 on which a rotary shaft 31 is installed, a pulley 33 rotatably installed on the main body 32 to be coaxial with the rotary shaft 31, and a hub member 34 having a flange 34b in which a plurality of recesses 34a are formed around the circumference at intervals of a predetermined distance. A frictional surface 33a and a housing portion 33b are formed on the front and rear surfaces of the pulley 33, respectively. The flange 34b may be integrally formed on the hub member 34 or may be separately fabricated and then coupled to the hub member 34.

An elastic member 35 is inserted into each recess 34a of the flange 34b such that a portion of the elastic member 35 protrudes from the flange 34b. Here, the elastic member 35 is made of rubber and has a circular shape.

Figure 4:
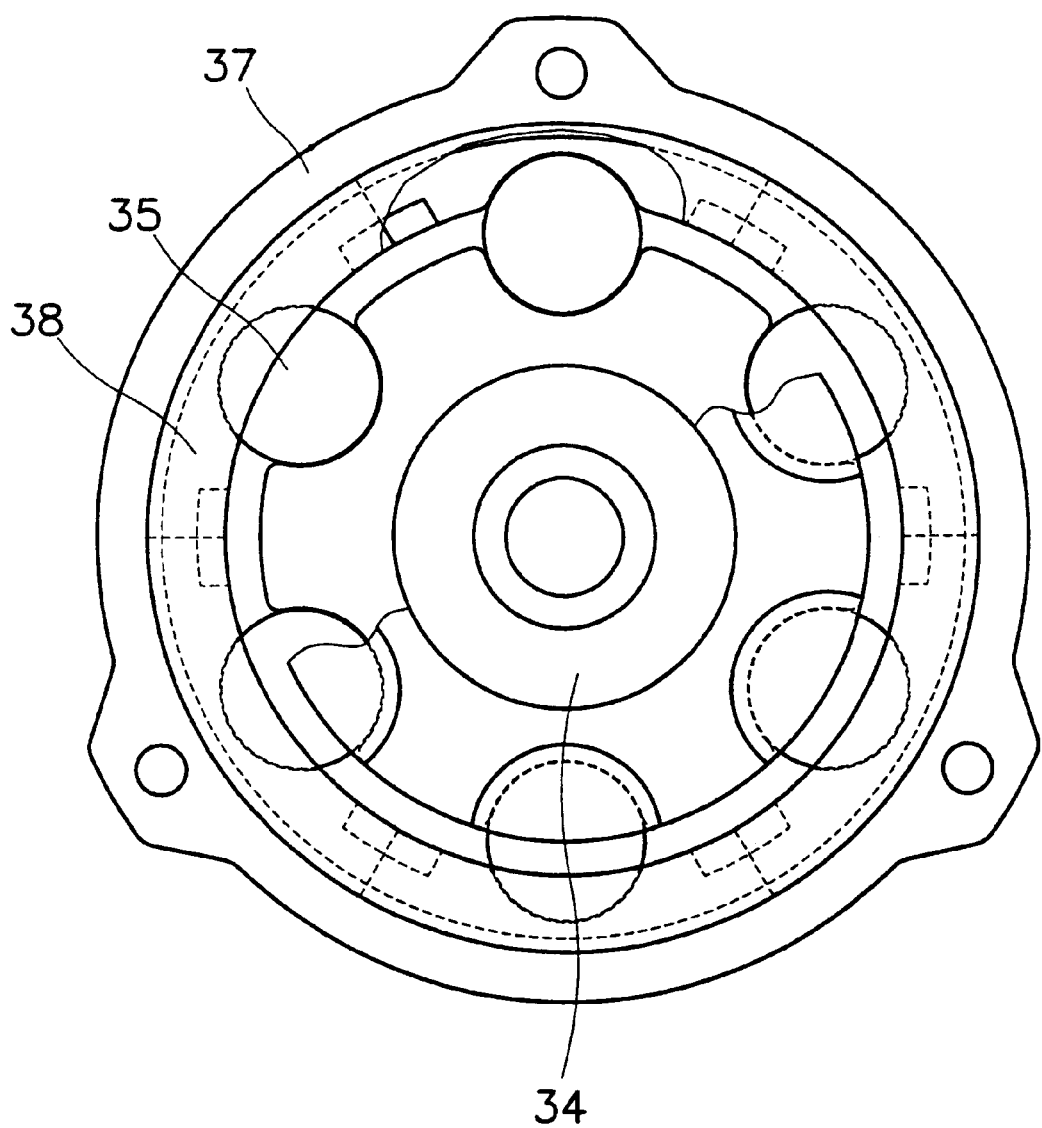
FIG. 4 is a front view illustrating the connection state of an outer ring member, an elastic member and a stopper member of the clutch shown in FIG. 2.

As shown in FIG. 4, ends of the elastic members 35 projecting outward from the recesses 34a are interposed between the outer ring member 37 and the stopper member 38 to then be supported thereby.

The outer ring member 37 includes a skirt portion 37b for accommodating the elastic member 35, a supporting portion 37a extending radially inwardly from the skirt portion 37b, for supporting one side of the protruding portion of the elastic member 35, and a disk fixing portion 37c extending radially from the skirt portion 37b. The supporting portion 37a, the skirt portion 37b and the disk fixing portion 37c may be integrally formed by pressing a flat plate.

The other side of the protruding portion of the elastic member 35 whose one side is supported by the supporting portion 37a is supported by a stopper member 38 installed on the outer ring member 37. The stopper member 38 is formed by a plurality of unit members 38a juxtaposed with one another in an annular shape. In other words, a coupling protrusion 39a is formed on one-end surface of the unit member 38a, and a coupling groove 39b to which the coupling protrusion 39a is coupled to, is formed on the other-end surface of another neighboring unit member. The connection of the unit members is not limited to this embodiment and various modifications are possible.

A supporting groove 38b by which the protruding end of the elastic member 35 is housed and supported is formed in the unit member 38a. The stopper member 38 is preferably formed of synthetic resin.

A rotation preventing means 40 prevents the stopper member 38 and the outer ring member 37 from slipping with respect to each other. In other words, a latching piece 41 protruding inwardly from the outer ring member 37 is coupled to a latching groove 42 formed on the stopper member 38, thereby preventing mutual slipping of the stopper member 38 and the outer ring member 37. Preferably, the latching piece 41 is formed by cutting a part of the supporting portion 37a and bending the part inward. The latching groove 42 is preferably formed in the connection boundary of the unit members 38a.

A disk 50 on which an opening 51 through which the hub member 34 passes, is fixed on the disk fixing portion 37c of the outer ring member 37 by a rivet 52. It is possible to prevent the stopper member 38 from deviating from the outer ring member 37 by the connection between the outer ring member 37 and the disk 50. The disk 50 is arranged to be spaced a predetermined gap apart from the frictional surface 33a of the pulley 33.

An electromagnet assembly 60 fixed on the main body 32 of the compressor is inserted into the housing portion 33b of the pulley 33. Reference numeral 70 indicates a bearing.

The operation of the clutch for a compressor having the aforementioned configuration will now be described.

To transmit power from the pulley 33 rotated by the engine of an automobile to the rotary shaft 31 of the compressor 30, a predetermined current is applied to an electromagnet 60a. Then, the disk 50 supported on the outer ring member 37 is tightly coupled to the frictional surface 33a of the pulley 33 by the magnetic force of the electromagnet 60a so that the power of the pulley 33 is transmitted to the rotary shaft 31.

In more detail, the disk 50 and the outer ring member 37 connected thereto move toward the frictional surface 33a of the pulley 33 due to the magnetic force of the electromagnet 60a. At this time, the elastic members 35 supported between the outer ring member 37 and the stopper member 38 and in the recesses 34a of the flange 34b are elastically deformed. The edges of the recesses 34a and the supporting groove 38b are smoothly rounded so that the elastic members 35 are not damaged or cracked during deformation.

In a state in which the disk 50 contacts the frictional surface 33a of the pulley 33, the rotational power of the pulley 33 is transmitted to the rotary shaft 31 via the disk 50, the outer ring member 37, the elastic member 35 and the hub member 34. Here, since the latching piece 41 formed on the outer ring member 37a and the latching groove 42 formed on the stopper member 38 are connected to each other, it is possible to prevent the stopper member 38 from rotating relative to the outer ring member 37.

To stop the compressor 30, the current flowing to the electromagnet 60a is interrupted. Then, the disk 50 is separated from the frictional surface 33a of the pulley 33 to be restored to its original place by the restoring force of the elastically deformed elastic member 35.

Figure 5:
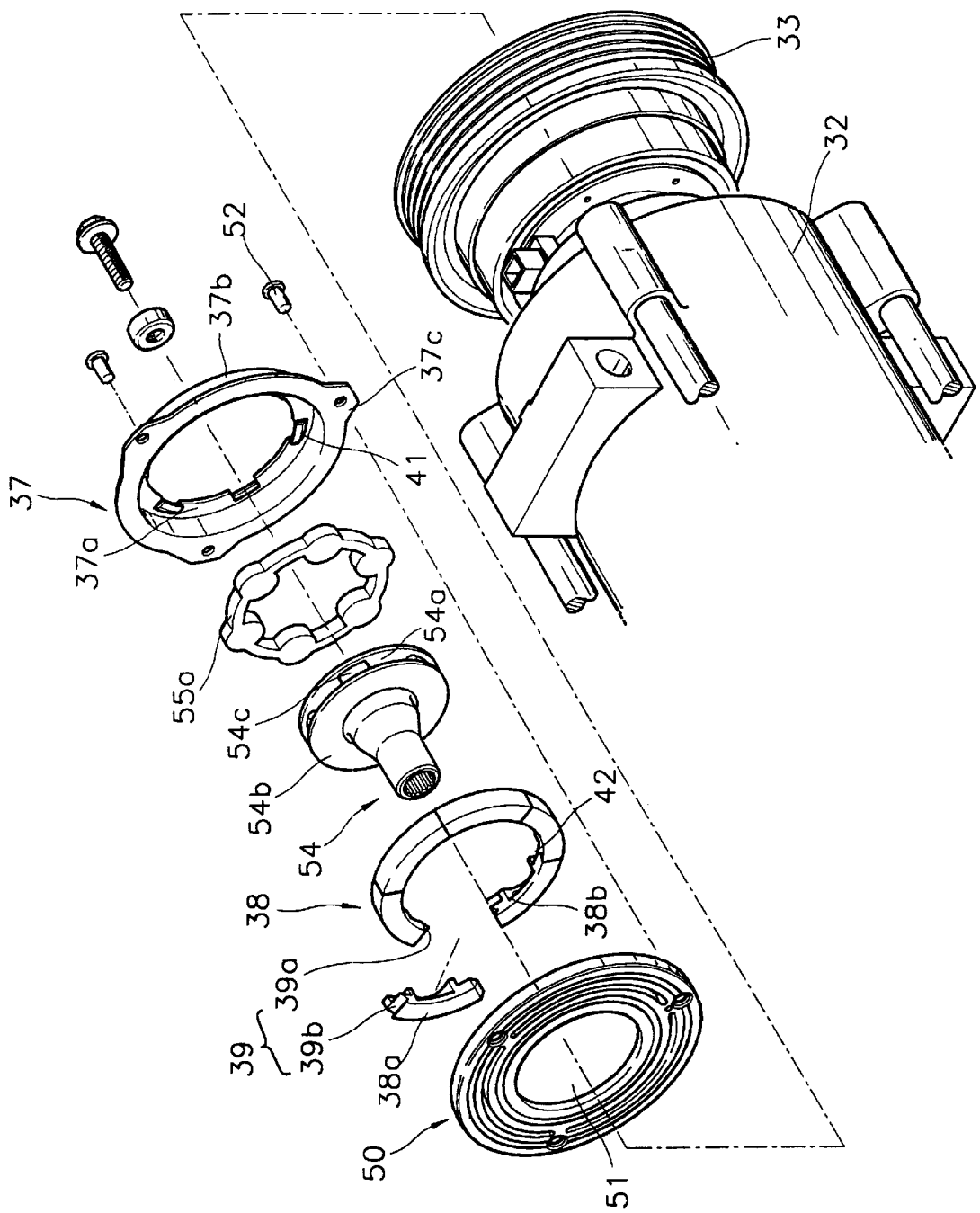
FIG. 5 is an exploded perspective view illustrating a clutch for a compressor according to a second embodiment of the present invention.
Figure 6:
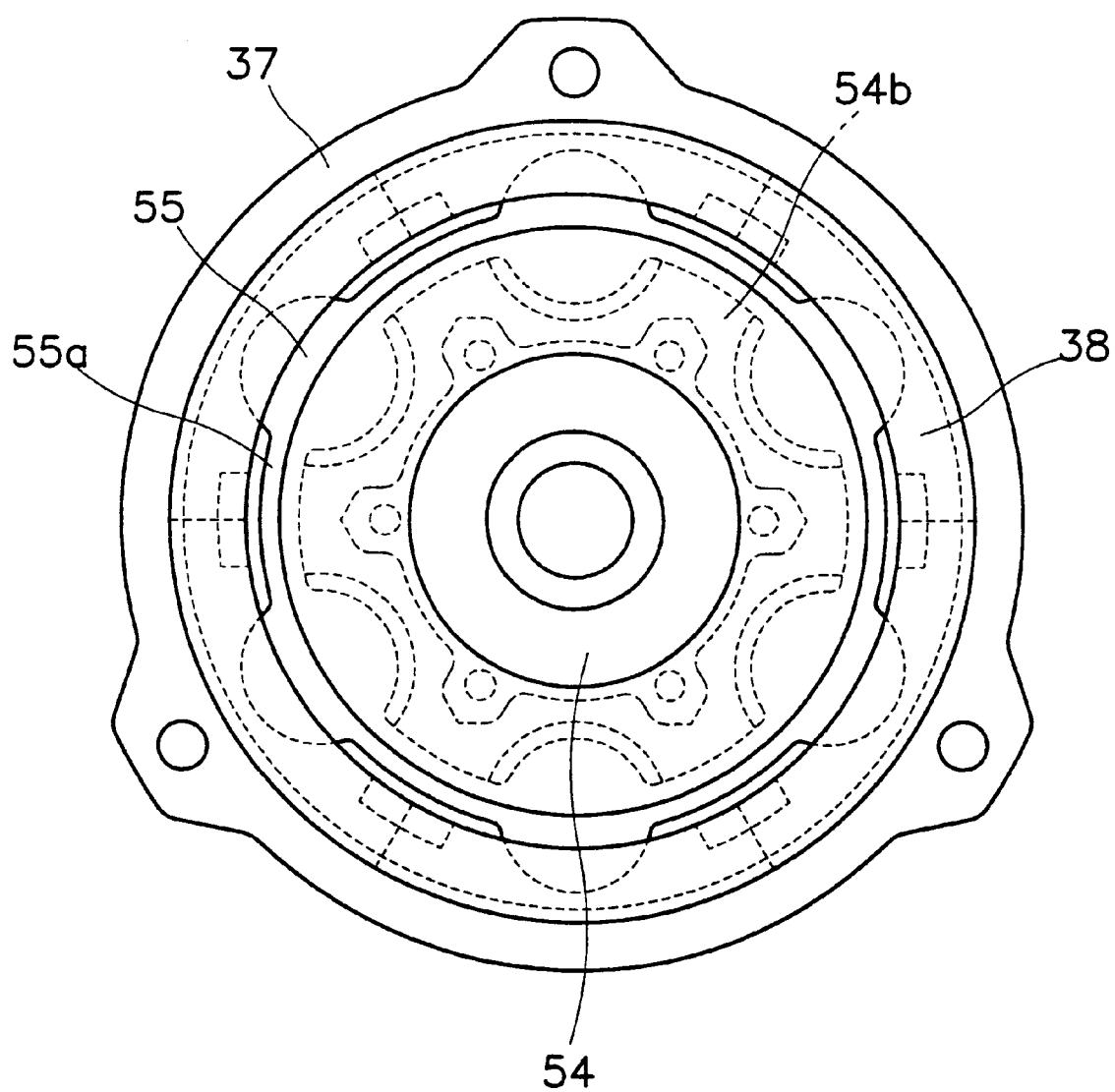
FIG. 6 is a front view illustrating the connection state of an outer ring member, an elastic member and a stopper member of the clutch shown in FIG. 5.

FIGS. 5 and 6 show a compressor employing a clutch according to a second embodiment of the present invention. Here, the same reference numerals designate the same elements in the foregoing drawings.

According to this embodiment, circular-shaped elastic members 55 are mutually connected by a connection band 55a. Also, a recess 54a into which the elastic member 55 is received is formed on a flange 54b of a hub member 54, and an insertion groove 54c into which the connection band 55a is received in, is formed between the recesses 54a.

Figure 7:
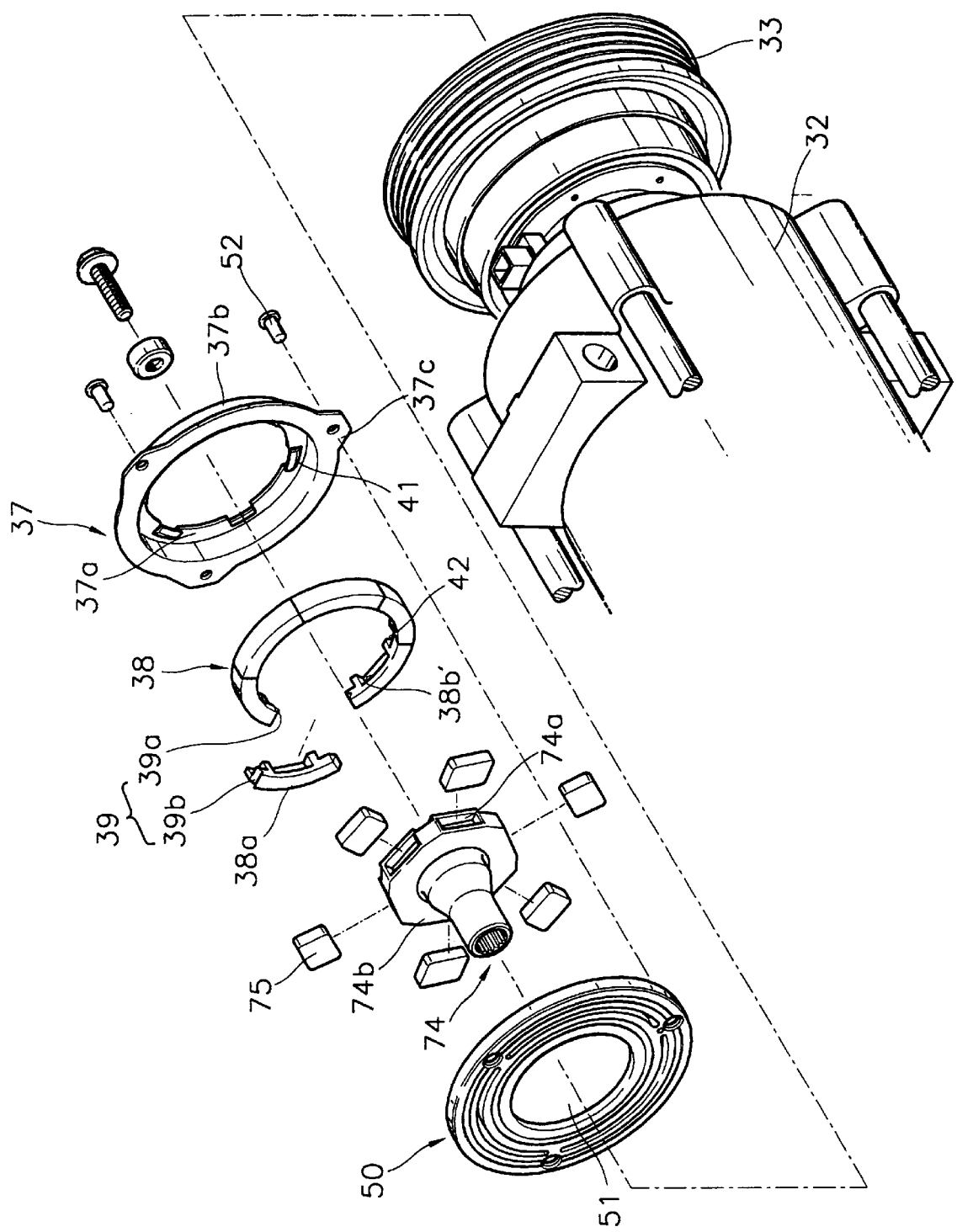
FIG. 7 is an exploded perspective view illustrating a clutch for a compressor according to a third embodiment of the present invention.
Figure 8:
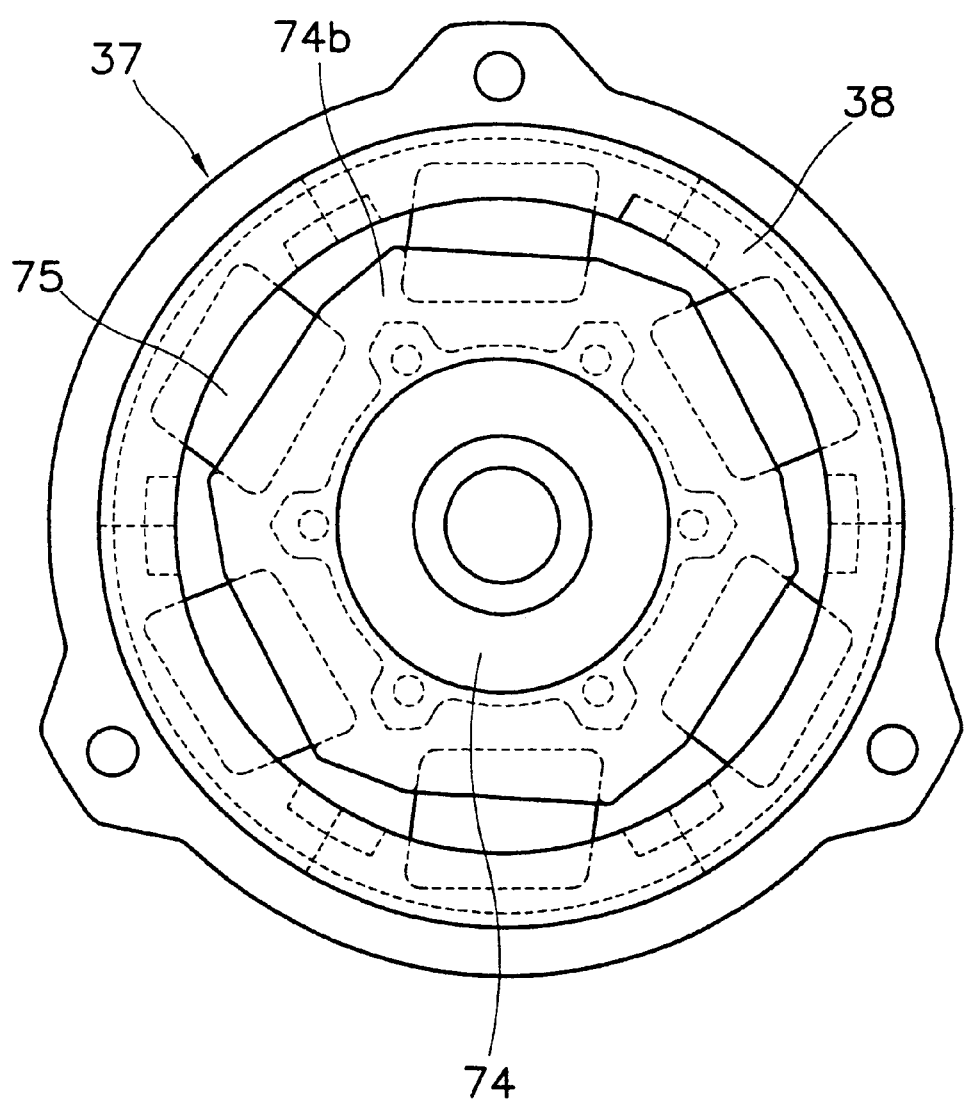
FIG. 8 is a front view illustrating the connection state of an outer ring member, an elastic member and a stopper member of the clutch shown in FIG. 7.

The elastic members 35 and 55 shown in FIGS. 2 and 5 are circular but the shapes are not limited thereto. As shown in FIGS. 7 and 8 illustrating a third embodiment of the present invention, an elastic member 75 may be formed in a cubic shape. In this case, recess 74a formed in a flange 74b of a hub member 74, into which the elastic member 75 is mounted, is formed to have a corresponding shape. Also, a supporting groove 38b' of the stopper member 38 is formed to have a shape corresponding to that of the elastic member 75.

Figure 9:
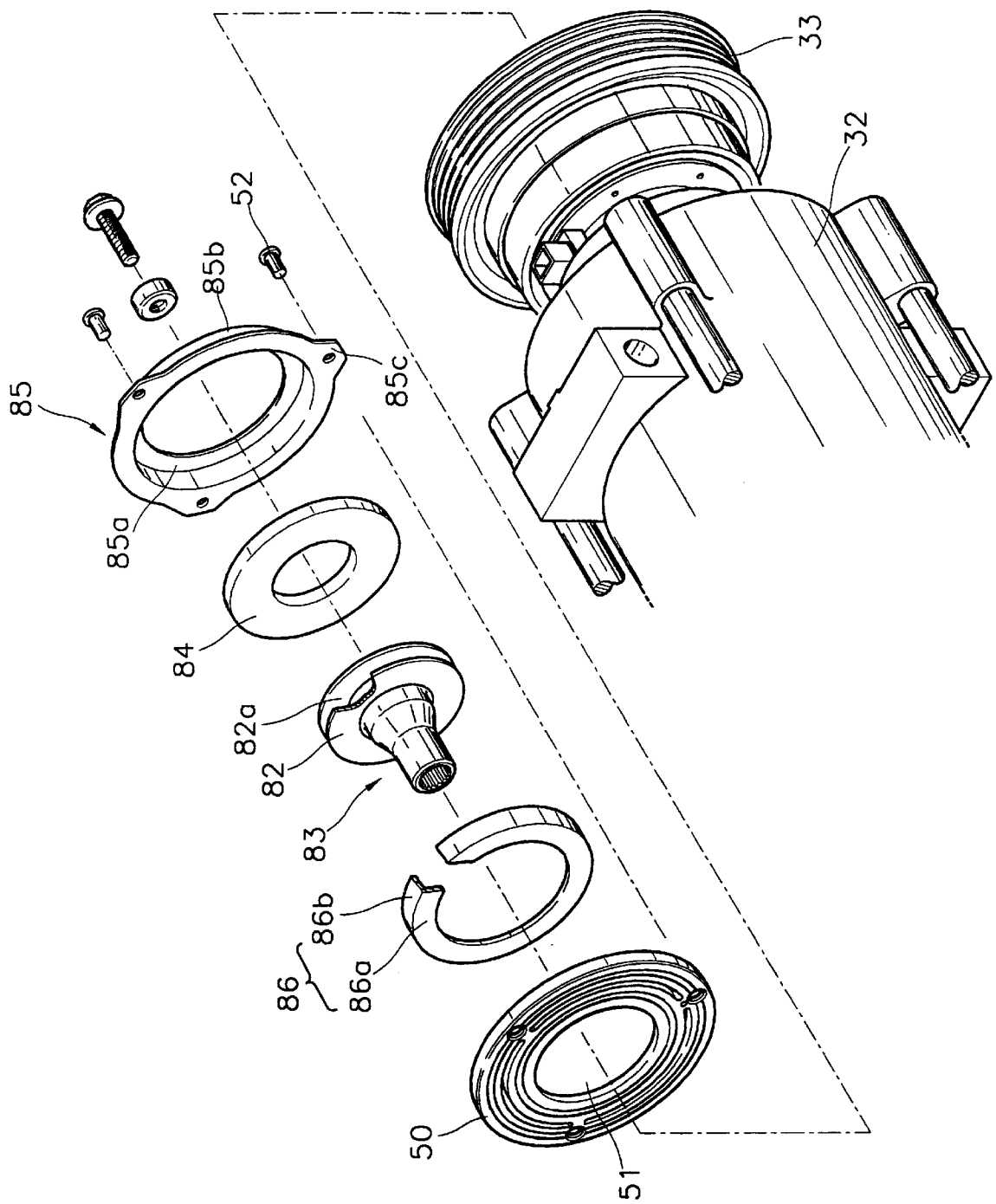
FIG. 9 is an exploded perspective view illustrating a clutch for a compressor according to a fourth embodiment of the present invention.
Figure 10:
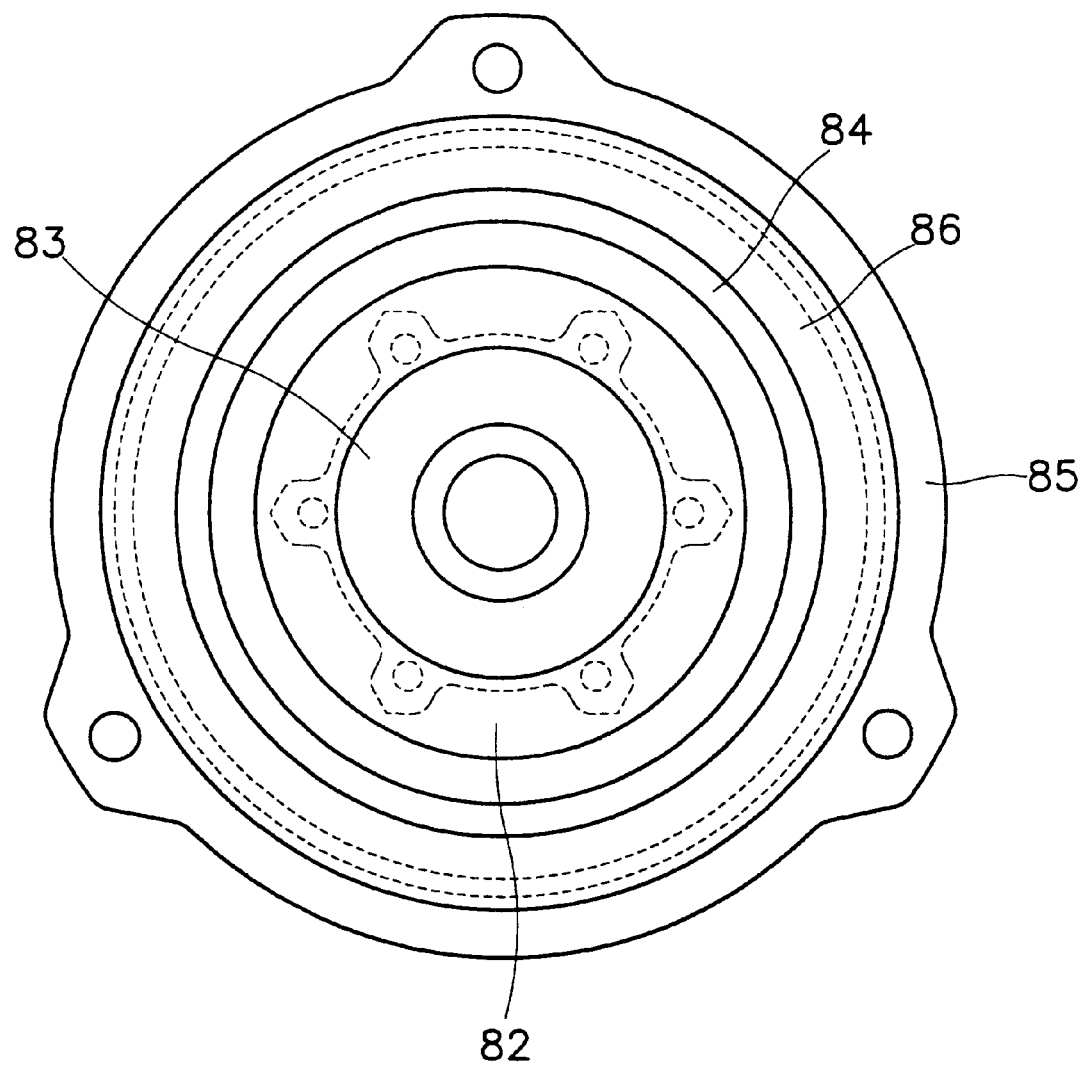
FIG. 10 is a front view illustrating the connection state of an outer ring member, an elastic member and a stopper member of the clutch shown in FIG. 9.

FIGS. 9 and 10 show a compressor employing a clutch according to a fourth embodiment of the present invention. Here, the same reference numerals designate the same elements in the foregoing drawings.

As shown, in a hub member 83 fixed on the rotary shaft (31 of FIG. 2) of the compressor, there is provided a flange 82 having a single recessed groove 82a formed along the circumference of the flange 82.

A ring-shaped elastic member 84 is inserted into the recessed groove 82a, the outer peripheral end of the elastic member 84 protrudes radially outward from the recessed groove 82a. The upper and lower surfaces of the elastic member 84 are flat.

The outer peripheral end of the elastic member 84 protruding from the recessed groove 82a, as shown in FIG. 10, is interposed between an outer ring member 85 and a stopper member 86 to then be supported. The outer ring member 85 includes a skirt portion 85b, a supporting portion 85a extended radially inward from the skirt portion 85b, for supporting one side of the outer peripheral end of the elastic member 84, and a disk fixing portion 85c extended radially outward from the skirt portion 85b.

The other side of the outer peripheral end of the elastic member 84 is supported by the stopper member 86 installed in the outer ring member 84. The stopper member 86 includes a flange 86a for supporting the other side of the elastic member 84 and a rim portion 86b for surrounding the outer peripheral portion of the elastic member 84.

The operation of the clutch according to this embodiment is the same as that of the above-described embodiments.

According to this embodiment, since the elastic member 84 supported to the recessed groove 82a of the flange 82 has a flat ring shape, the restoring force due to elastic deformation is large.

As described above, the clutch for a compressor according to the present invention has the following advantages.

First, since the elastic member is supported to the flange of the hub member and interposed between the outer ring member and the stopper member to then be supported, the overall volume of the clutch can be reduced. Thus, the space for installing the compressor employing the clutch can be reduced.

Second, since there is a multitude of elastic members or a single ring-shaped elastic member for providing a restoring force to a disk, the restoring force can be increased.

Third, at the moment the pulley and the disk are tightly coupled to each other to transmit the rotational power, the elastic member is deformed instantaneously. Thus, the shock due to the rotation of the rotary shaft of the compressor can be reduced.

Further, since the clutch is coupled to the elastic member without using a separate adhesive agent, the operation efficiency can be improved and a reliable clutch assembly can be obtained.

As described above, the clutch for a compressor according to the present invention is not limited to the above-described embodiments and various modifications and alterations may be made by one skilled in the art with the spirit and scope of the invention.

What is claimed is:

1. A clutch for a compressor comprising:
   a pulley rotatably installed on a rotary shaft which protrudes from the main body of the compressor;
   a hub member fixed on the rotary shaft and having a flange through which a plurality of recesses are formed at its outer peripheral surface at intervals of a predetermined distance;
   elastic members, parts of which are received in the respective recesses to be supported, and other parts of which protrude from the recesses;
   an outer ring member for supporting the protruding parts of the elastic members;
   an annular stopper member for supporting the protruding parts of the elastic members together with the outer ring member to prevent the elastic members from moving, the stopper member being supported on the inner peripheral surface of the outer ring member and having a plurality of supporting grooves into which the protruding parts of the elastic members are received to be supported; and
   a disk fixed on the outer ring member, for transmitting power by selectively being tightly coupled to or separated from a frictional surface of the pulley.

2. The clutch for a compressor according to claim 1, wherein the outer ring member comprises:
   a skirt portion for accommodating the elastic members; and
   a supporting portion extending radially inward from the skirt portion, for supporting one side of the protruding parts of the elastic members.

3. The clutch for a compressor according to claim 2, wherein the outer ring member further comprises:

a disk fixing portion extending radially from the skirt portion, and coupled to the disk.

4. The clutch for a compressor according to claim 3, wherein the stopper member comprises a plurality of juxtaposed unit members connected to each other and each having one of the supporting grooves formed therein.

5. The clutch for a compressor according to claim 1, wherein the stopper member comprises a plurality of juxtaposed unit members connected to each other and each having one of the supporting grooves formed therein.

6. The clutch for a compressor according to claim 5, wherein a coupling protrusion is formed at one side of each unit member, and a coupling groove to which the coupling protrusion is connected is formed at the corresponding side of a neighboring unit member.

7. The clutch for a compressor according to claim 1, wherein the stopper member is formed of synthetic resin.

8. The clutch for a compressor according to claim 1, wherein the elastic members are formed of rubber and have a circular shape.

9. The clutch for a compressor according to claim 1, wherein the elastic members are mutually connected by a connection band.

10. The clutch for a compressor according to claim 1, wherein the elastic members are formed of rubber and have a cubic shape.

11. The clutch for a compressor according to claim 1, further comprising:

rotation preventing means for preventing the stopper member from rotating relative to the outer ring member.

12. A clutch for a compressor comprising:

a pulley rotatably installed on a rotary shaft which protrudes from the main body of the compressor;

a hub member fixed on the rotary shaft and having a flange through which a plurality of recesses are formed at its outer peripheral surface at intervals of a predetermined distance;

elastic members, parts of which are received in the respective recesses to be supported, and other parts of which protrude from the recesses;

an outer ring member for supporting the protruding parts of the elastic members;

a stopper member for supporting the protruding parts of the elastic members together with the outer ring member to prevent the elastic members from moving;

a disk fixed on the outer ring member for transmitting power by selectively being tightly coupled to or separated from a frictional surface of the pulley; and rotation preventing means for preventing the stopper member from rotating relative to the outer ring member and comprising a latching piece extending inward and protruding from the outer ring member, and a latching groove formed on the stopper member so that the latching piece is inserted into the latching groove.

13. A clutch for a compressor comprising:

a pulley rotatably installed on a rotary shaft which protrudes from the main body of the compressor;

a hub member fixed on the rotary shaft and having a flange on which a single recessed groove is formed on its outer peripheral surface;

a ring-shaped elastic member having an inner peripheral portion received in the recessed groove to be supported, and an outer peripheral portion protruding from the recessed groove;

an outer ring member for supporting the outer peripheral portion of the elastic member and comprising a skirt portion for accommodating the elastic member and a supporting portion extending radially inward from the skirt portion for supporting one side of the outer peripheral portion of the elastic member;

an annular stopper member for supporting the outer peripheral portion of the elastic member together with the outer ring member to prevent the elastic member from moving, the stomper member being supported on the inner peripheral surface of the outer ring member and having a flange for supporting the other side of the outer peripheral portion of the elastic member; and a disk fixed on the outer ring member, for transmitting power by being selectively coupled tightly to or being separated from the frictional surface of the pulley.

14. The clutch for a compressor according to claim 13, wherein the outer ring member further comprises:

a disk fixing portion extending radially from the skirt portion and coupled to the disk.

* * * * *